(12) United States Patent
Lekas et al.

(10) Patent No.: US 12,224,995 B2
(45) Date of Patent: Feb. 11, 2025

(54) SYSTEM AND METHOD FOR THIRD PARTY SERVICE INTEGRATION INTO A BROWSER CLIENT APPLICATION

(71) Applicant: OpenMethods, Kansas City, MO (US)

(72) Inventors: Shannon Lekas, Cushing, TX (US); Gerrit Voorhis Lydecker, Jr., Los Angeles, CA (US); Carlos Gustavo Colombo, Oceanside, CA (US); Ankur Kanti Patel, Thousand Oaks, CA (US)

(73) Assignee: OPENMETHODS, Kansas City, MO (US)

(*) Notice: Subject to any disclaimer, the term of this patent is extended or adjusted under 35 U.S.C. 154(b) by 0 days.

(21) Appl. No.: 18/072,364

(22) Filed: Nov. 30, 2022

(65) Prior Publication Data

US 2024/0154945 A1 May 9, 2024

Related U.S. Application Data

(60) Provisional application No. 63/422,906, filed on Nov. 4, 2022.

(51) Int. Cl.
*H04L 9/40* (2022.01)
(52) U.S. Cl.
CPC .............................. *H04L 63/0807* (2013.01)

(58) Field of Classification Search
CPC ... H04L 63/10; H04L 63/102; H04L 63/0807; H04L 63/08; H04L 67/53; H04L 67/60; H04L 67/562; H04L 67/56; H04L 67/567; H04L 67/564; H04L 9/321; H04L 9/3213
See application file for complete search history.

(56) References Cited

U.S. PATENT DOCUMENTS

| | | | |
|---|---|---|---|
| 11,340,961 B2 | 5/2022 | Kesavan et al. | |
| 11,431,698 B2 | 8/2022 | DeGennaro et al. | |
| 2015/0134956 A1* | 5/2015 | Stachura | H04L 63/168 713/168 |
| 2016/0065555 A1* | 3/2016 | Branden | H04L 63/0807 726/7 |
| 2016/0219060 A1* | 7/2016 | Karunakaran | H04L 63/0884 |
| 2016/0337321 A1* | 11/2016 | Lin | H04L 9/3263 |
| 2017/0187714 A1* | 6/2017 | Guo | H04L 67/02 |
| 2017/0214683 A1* | 7/2017 | Kroehling | H04L 63/061 |
| 2017/0346804 A1* | 11/2017 | Beecham | H04L 67/56 |
| 2017/0346830 A1* | 11/2017 | Goldfarb | H04L 67/01 |
| 2018/0041510 A1* | 2/2018 | Burch | H04L 63/18 |
| 2018/0075231 A1* | 3/2018 | Subramanian | H04L 63/0807 |
| 2018/0081983 A1* | 3/2018 | Carru | H04L 63/0815 |
| 2018/0167384 A1* | 6/2018 | Raepple | G06F 21/335 |

(Continued)

*Primary Examiner* — Tae K Kim
(74) *Attorney, Agent, or Firm* — Galvin Patent Law LLC; Brian R. Galvin

(57) ABSTRACT

A system and method for third party application integration into browser client application, utilizing an authentication engine operating on a cloud device that presents an application integration service token for integration through the operating system and software applications on the client device, wherein interacting with the application integration service token allows a workflow engine to produce third party data objects to be used to execute customer relationship management client workflows incorporating client application, context, and trust information.

4 Claims, 9 Drawing Sheets

(56) References Cited

U.S. PATENT DOCUMENTS

| | | | |
|---|---|---|---|
| 2019/0103968 A1* | 4/2019 | Srinivasan | H04L 9/0894 |
| 2019/0238598 A1* | 8/2019 | Mohamad Abdul | H04L 63/0807 |
| 2019/0306138 A1* | 10/2019 | Carru | H04L 41/28 |
| 2019/0372957 A1* | 12/2019 | Dunjic | G06Q 20/322 |
| 2019/0394204 A1* | 12/2019 | Bansal | H04L 63/0815 |
| 2021/0084032 A1* | 3/2021 | Ding | G06F 9/54 |
| 2022/0150249 A1 | 5/2022 | Zeller et al. | |
| 2022/0413879 A1* | 12/2022 | Passey | G06F 9/44521 |
| 2023/0393908 A1* | 12/2023 | Mahoney | G06F 9/543 |

* cited by examiner

SYSTEM AND METHOD FOR THIRD PARTY SERVICE INTEGRATION INTO A BROWSER CLIENT APPLICATION

CROSS-REFERENCE TO RELATED APPLICATIONS

Priority is claimed in the application data sheet to the following patents or patent applications, the entire written description of each of which is expressly incorporated herein by reference in its entirety: 63/422,906

BACKGROUND

Field of the Art

The disclosure relates to the field of customer relationship management browser technology, specifically to the field of integrating cloud based workflow solutions with cloud based authentication mechanisms.

Discussion of the State of the Art

Existing client side applications like customer relationship management browser clients do not have a method to prevent man-in-the-middle and other types of security attacks on authentication services as they pass security credentials and tokens in plain text.

What is needed is a system and method for third party service integration into a browser client application which reduces the risk for security attacks and which ensures no client side credentials are leaked onto the network.

SUMMARY

Accordingly, the inventor has conceived and reduced to practice, a system and method for third party application integration into browser client application, utilizing an authentication engine operating on a cloud device that presents an application integration service token for integration through the operating system and software applications on the client device, wherein interacting with the application integration service token allows a workflow engine to produce third party data objects to be used to execute customer relationship management client workflows incorporating client application, context, and trust information.

According to a preferred embodiment, a system for third party application integration into a browser client application is disclosed, comprising: an authentication engine comprising at least a plurality of programming instructions stored in a memory of, and operating on at least one processor of, a computing device, wherein the plurality of programming instructions, when operating on the at least one processor, causes the computing device to: receive user login information, the user login information comprising one or more of a session ID, a device ID, and client ID; create a client session token, wherein the client session token is based on the user login information; send the client session token to a workflow manager; receive a wrapper a token from the workflow manager, the wrapper token comprising a third party service request and the client session token; parse the wrapper token to extract client the session token; validate a user associated with the client session token by comparing client session token data with user data stored in a database; send the third party service request to the appropriate third party service; receive, from the third party service, one or more third party data objects; and send the one or more third party data objects to the workflow engine; and the workflow engine comprising at least a second plurality of programming instructions stored in a memory of, and operating on at least one processor of, a second computing device, wherein the second plurality of programming instructions, when operating on the at least one processor, causes the second computing device to: receive the client session token from the authentication engine; receive the third party service request, the third party service request comprising service request information; create the wrapper token by combining the third party service request information with the client session token; send the wrapper token to the authentication engine; receive the one or more third party data objects; and display the one or more third party data objects in a browser based application user interface.

According to another preferred embodiment, a method for third party application integration into a browser client application is disclosed, comprising the steps of: receiving user login information, the user login information comprising one or more of a session ID, a device ID, and client ID; creating a client session token, wherein the client session token is based on the user login information; sending the client session token to a workflow manager; receiving a wrapper a token from the workflow manager, the wrapper token comprising a third party service request and the client session token; parsing the wrapper token to extract client the session token; validating a user associated with the client session token by comparing client session token data with user data stored in a database; sending the third party service request to the appropriate third party service; receiving, from the third party service, one or more third party data objects; sending the one or more third party data objects to the workflow engine; receiving the client session token from the authentication engine; receiving the third party service request, the third party service request comprising service request information; creating the wrapper token by combining the third party service request information with the client session token; sending the wrapper token to the authentication engine; receiving the one or more third party data objects; and displaying the one or more third party data objects in a browser based application user interface.

According to an aspect of an embodiment, the browser based application is customer relationship management system.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
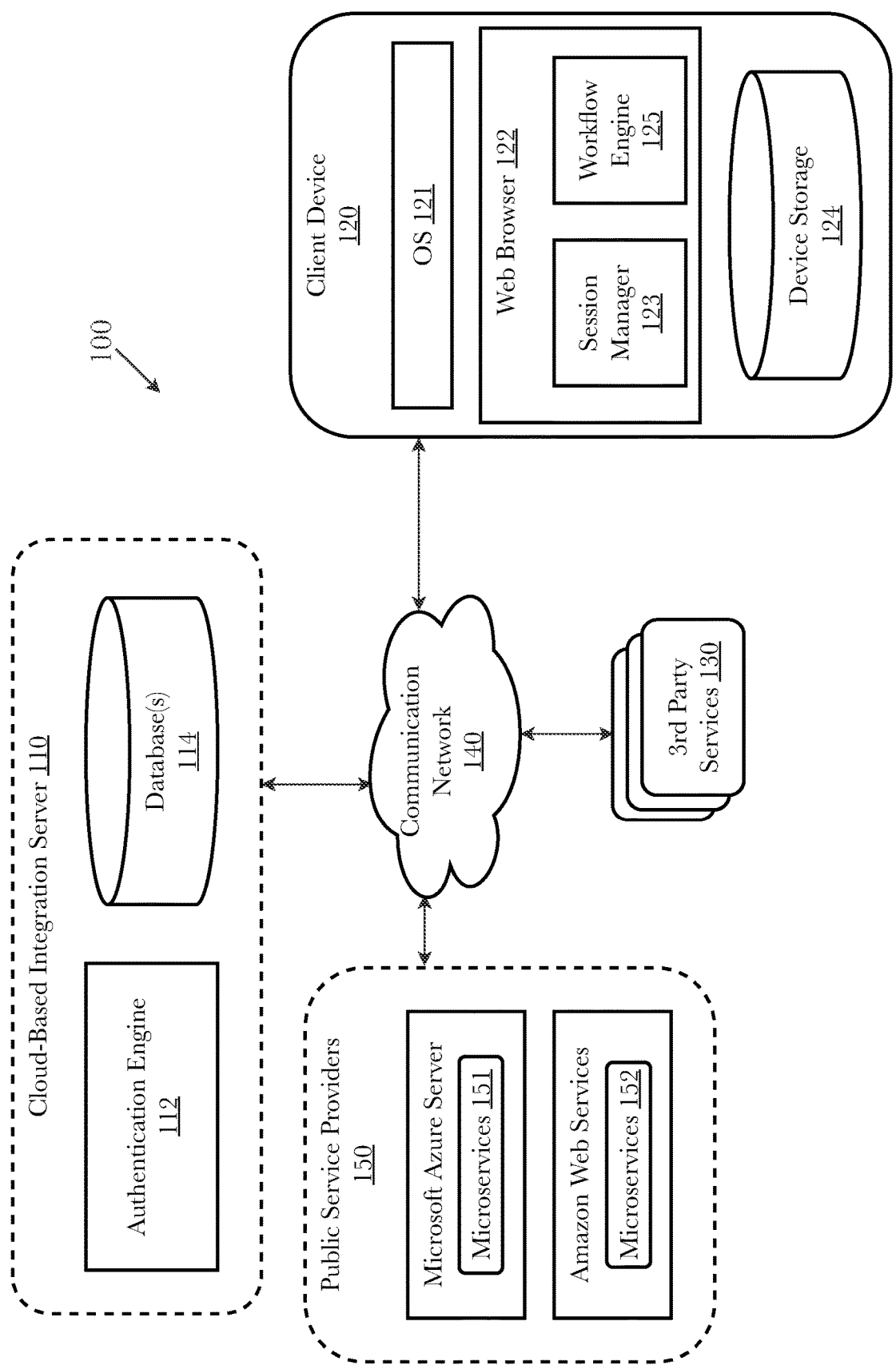
FIG. 1 is a block diagram illustrating an exemplary system architecture for third party service integration into a browser client application, according to one embodiment.

The inventor has conceived, and reduced to practice, a system and method for third party application integration into browser client application, utilizing an authentication engine operating on a cloud device that presents an application integration service token for integration through the operating system and software applications on the client device, wherein interacting with the application integration service token allows a workflow engine to produce third party data objects to be used to execute customer relationship management client workflows incorporating client application, context, and trust information.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture 100 for third party service integration into a browser client application, according to one embodiment. According to the embodiment, the system 100 comprises a cloud-based integration server 110, one or more client device 120, a plurality of public cloud-based service providers 150 such as, for example, MICROSOFT AZURE® and AMAZON WEB SERVICES®, a plurality of $3^{rd}$ party services 130 such as private service providers, and a communication network 140 which allows one or more of these components (and other components not shown) to be communicatively coupled to facilitate bi-directional data exchange over a suitable communication network such as, for example, the Internet or a cellular telephone network.

According to the embodiment, client device 120 comprises an operating system 121, a web browser 122 application, and device storage 124 such as a memory and/or non-volatile storage device (e.g., hard drive, solid state drive, etc.). Examples of client devices include, but are not limited to, personal computers, laptops, tablet computers, smart phones, smart wearables, personal digital assistants, and/or the like. Also present on client device 120 but not shown in the drawing is at least one processor operating on client device 120, the at least one processor configured to read, process, and execute a plurality of machine readable instructions which cause the client device to perform at least some of the functions and processes described herein. Operating within the web browser 122 of client device 120 is a session manager 123 and a workflow engine 125 which both provide support for third party service integration directly into web browser 122. According to various implementations, session manager 123 is configured to monitor and store session state information associated with the client device 120 user's current (e.g., ongoing) session with a browser based application such as, for example, a customer relationship management ("CRM") system. According to an aspect, session state information may comprise session variables such as (non-limiting) session login time (e.g., time at which the user first logged into the CRM system), client device identification or identifiers (e.g., MAC address, IMEI number, ESN number, etc.), and user identification or identifiers (e.g., username, password, email address, group, privileges, etc.). In some implementations, session manager 123 may also store a client session token associated with client device 120 and received from authentication engine 112 responsive to a client session login request. When a client session login request is generated within the browser 122, the session state information may be retrieved by session manager 123 and sent to workflow engine 125 which sends the client session state data to cloud-based integration server 110.

According to the embodiment, workflow engine 125 is present to support third party service integration into the browser based application (e.g., browser-based CRM system) and configured to process browser based service requests originating from inside the browser user interface (e.g., CRM system user interface). When a service request is made, workflow engine retrieves a client session token from session manager 123 and creates a wrapper token. In some implementations, the wrapper token comprises the client session token and any appropriate service request data which was received as part of the service request. Workflow engine 125 can send the wrapper token to authentication engine 112 for third party service integration. As an example, a client clicks on an interactive button for a service (e.g., service request) within the browser 122 UI, which causes an API call in the browser 122, wherein workflow engine 125 captures this API call and includes it in the wrapper token which is then sent to cloud-based integration server 110 wherein the service request may be fulfilled. Upon fulfillment of the request, the workflow engine 112 may receive one or more third party service data objects (e.g., JSON, etc.) from an authentication engine 112 stored and operating within the cloud-based integration server 110 and then display the one or more data objects within the user interface of the browser 122.

According to the embodiment, cloud-based integration server 110 may comprise an authentication engine 112 operating on a cloud device 110 that authenticate an user (i.e., client) and presents a service integration token (or authentication identifier token) for integration through the operating system and software applications (i.e., web browser 122) on the client device 120, wherein interacting with the service integration token produces third party data objects to be used to execute customer relationship management ("CRM") client workflows incorporating client application, context, and trust information. Cloud-based integration server 110 may comprise one or more computing devices, each of the one or more computing devices comprising at least one processor and a memory. In some implementations, cloud-based integration server 110 may be a distributed architecture wherein the components and functionality of the system may be distributed across two or more computing devices at a given location (e.g., a data center) or distributed across two or more computing devices at different geographic locations (e.g., two data centers).

According to the embodiment, authentication engine 112 can be configured to receive client session login requests or data from a browser based application operating on the client device 120. For example, a client may be a contact center agent and the browser based application may be a CRM system. In some implementation, the client session login request or data may comprise information related to the specific client device from which the request/data originated from, session details (e.g., session state) associated with the client's current session within the browser based application (e.g., CRM system), and client information including, but not limited to, username, password, group, privileges, and/or the like. When authentication engine 112 receives a client session login request/data it may store the received data in a database 114. In some implementations, the stored data may be used to validate users (e.g., clients) associated with a received service request. Once the client session login data has been stored, authentication engine 112 may create and transmit a client session token to a session manager 123 operating within the web browser 122 of the client device 120. The client session token represents that the user of the client device has successfully logged into the cloud-based integration server 110 and can be used to authenticate the user during subsequent service requests from client device 120. In some implementations, the client session token may comprise session state information such as, for example, device ID, session ID, and user/client ID information.

According to the embodiment, authentication engine 112 is further configured to receive a wrapper token from workflow engine 125. A client may submit a service request (such as, for example, via pressing on an interactive element of the browser UI) which is intercepted by workflow engine 125 and passed as a wrapper token to authentication engine 112. Authentication engine 112 can parse the wrapper token to retrieve the session information embedded into the session token. Authentication engine 112 can validate the user by comparing the parsed session information to stored session information in database 124. If the user cannot be validated, then the service request is terminated and, in some implementations, an error message may be displayed to the user via the browser 122 interface on the client device. If the user can be validated because the session information matches stored information in database 124, then authentication engine 112 may generate an authentication identifier token. In various implementations, the authentication identifier token may be logically linked to the wrapper token. In some aspects, authentication identifier token may comprise service request information and credentials. Authentication engine 112 can send the authentication identifier token to the third party service 150, 130 and/or third party microservice 151, 152 associated with the service request. Authentication engine 112 receives back from the third party service a payload (e.g., whatever data was necessary to fulfill service request) in the form of one or more third party data objects (e.g., JSON files, XML files, etc.) which may or may not be encrypted, and sends the payload to workflow engine 112 which causes the third party data objects to be displayed in the browser 122 user interface.

Figure 2:
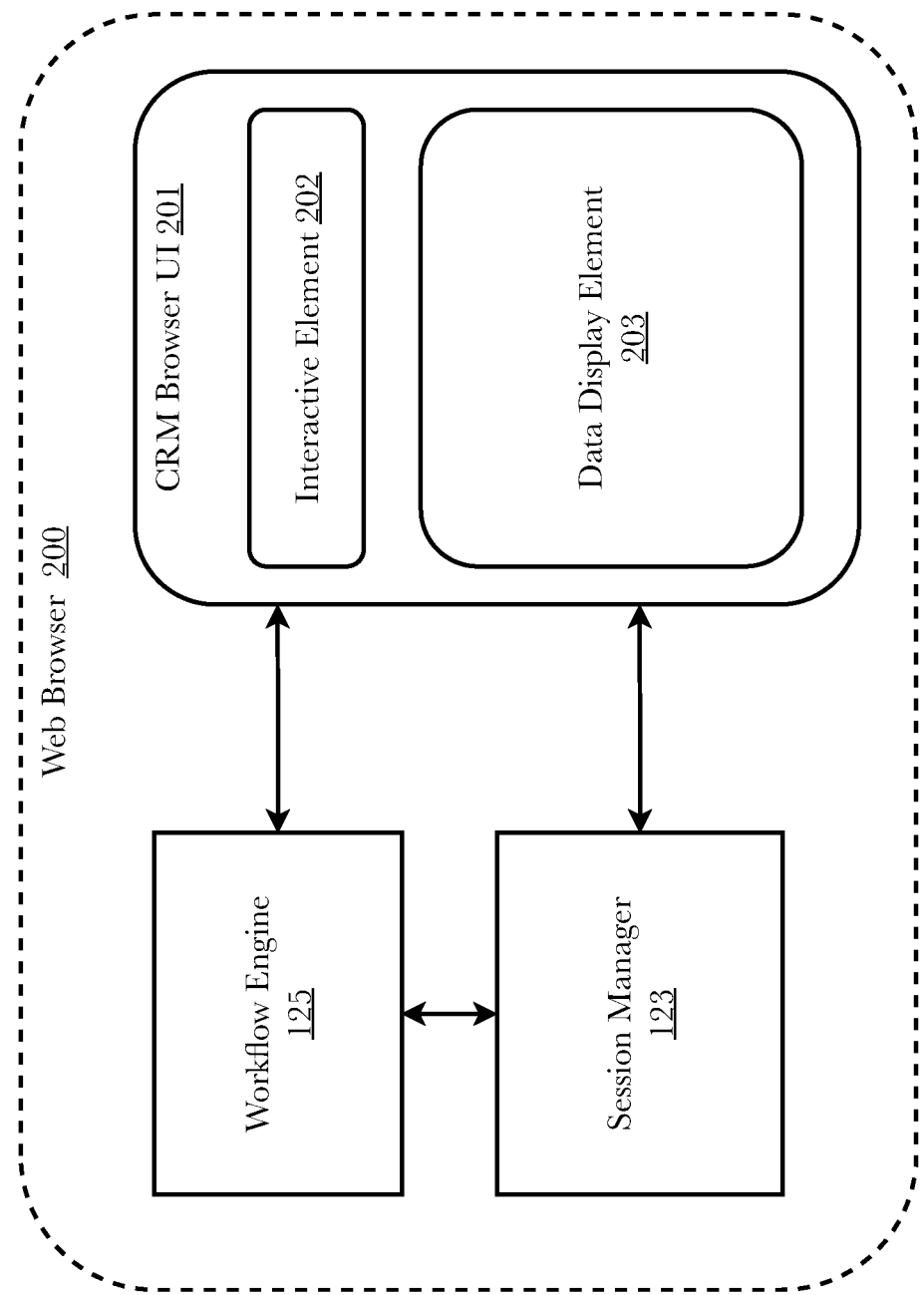
FIG. 2 is a block diagram illustrating an exemplary web browser utilizing third party service integration, according to an embodiment.

FIG. 2 is a block diagram illustrating an exemplary web browser 200 utilizing third party service integration, according to an embodiment. A web browser 200 may be operating on a client device 120 and may be any appropriate web browser application known those skilled in the art such as, for example, Internet Explorer, Google Chrome, Apple Safari, Mozilla Firefox, etc. Operating within the web browser 200 are components of the third party service integration system, a workflow engine 125 and session manager 123. A user of the client device 120 can use web browser 200 to access a browser-based application such as a browser-based CRM system which displays in the web browser a CRM browser interface 201. Browser interface 201 may further comprise a plurality of interactive elements 202 such as (the non-limiting) buttons, links, dropdown menus, file browsers, and/or the like, and a plurality of data display elements 203 which provide space within the browser UI 201 for data to be viewed and managed. Session manager 123 can be configured to capture and store session state variables related to a user's current session with the CRM system including, but not limited to, device identifier data, user data, and session data (e.g., login time, length of session, etc.). Session manager 123 can also be configured to store a client session token received from authentication engine 112 responsive to a client session login request from CRM browser UI 201 (or workflow engine 125) to cloud-based integration server 110. When a client session login request is made session manager 123 may send session state information to authentication engine 112 either directly or via workflow engine 125 depending on the implementation. In return, session manager 123 (or workflow manager 125) receives a client session token which logs in and authenticates the user with cloud-based integration server 110 and helps facilitate third party service integration into the CRM browser UI 201.

In operation, a user of client device 120 may submit a service request by interacting with an interactive element 202 of the CRM browser UI 201. For example, within the CRM bowser UI 201 there is displayed a button that says get order tracking information which, when clicked upon by the CRM user (e.g., contact center agent) generates a service request for an order tracking service provided by a third party service provider 150, 130. The service request may be intercepted or obtained by workflow engine 112 which combines the service request information with the client session token stored in session manager 123 to form a wrapper token which is sent to authentication engine 112. As an example, clicking on interactive element 202 such as a button may generate a service request in the form of an application programming interface ("API") call, wherein the API call may comprise various service request information (e.g., service address, requested data, client data and metadata, etc.). Authentication engine 112 parses the received wrapper token to first validate the user wherein, upon successful user validation, the service request is passed to the third party service as part of an authentication identifier token. Authentication engine 112 receives back from the third party service the payload (e.g., order tracking information) which may be in the form of one or more various types of data objects. The payload may be sent to workflow engine 125 which can display the third party data objects in a data display element 203 of the CRM browser UI 201.

In this way authentication engine 112 can provide improved security for the client and client device 120 by facilitating data exchange between and a plurality of public and private $3^{rd}$ party services and/or microservices whereby the user does not have to directly send their credentials to the plurality of third party services thus reducing the risk of malicious cyberattacks such as man in the middle and other such network packet capturing/monitoring attack vectors. Additionally, workflow engine 125 and session manager 123 provide authentication and third party service and/or microservice integration functions wherein third party data objects may be used to execute various user defined workflows all while operating within the web browser 200 of a client device.

In some implementations, the workflow engine 125 is able to display more than one payload on the CRM browser UI 201 utilizing one or more display elements 203.

Detailed Description of Exemplary Aspects

Figure 3:
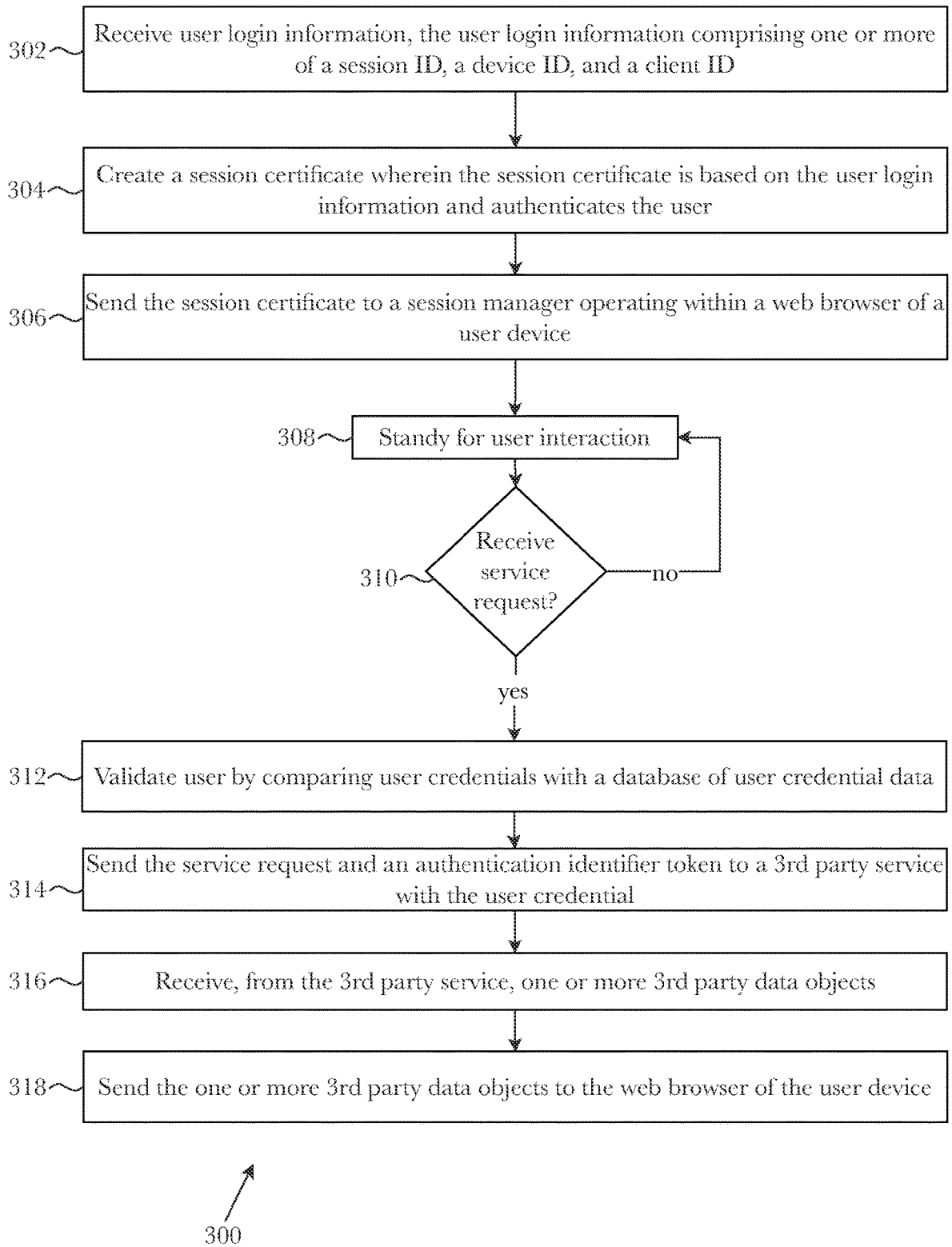
FIG. 3 is a flow diagram illustrating an exemplary method for providing client authentication and third party integration, according to an embodiment.

FIG. 3 is a flow diagram illustrating an exemplary method 300 for providing client authentication and third party service integration, according to an embodiment. According to the embodiment, the process begins at 302 when authentication server 112 (or some other component of cloud-based integration server 110) receives user login information from a browser based component of system 100 such as workflow engine 125 and/or session manager 123 of a client device 120. The user login information may one or more of a session ID, a device ID, and a client ID (e.g., username and/or password). Some or all of the user login information may be used to compare against stored data in a database 114 to determine if the user has logged in before. Some or all of the user login information may be stored in database 114 such as in a user profile associated with the user who submitted the user login information. Once received, the user of client device 120 is logged into system 100. At 304 authentication engine 112 can create a session certificate (e.g., token) which provides user authentication for transacting with cloud-based integration server 110 and third party service integration functions. In some implementations, the session certificate may comprise or be derived from all or a subset of user login information. Authentication manager 112 can 306 send the session certificate to the client device browser where it can be captured by session manager 123 operating within the web browser of the client device 120. At 308 authentication engine 112 may operate in standby, waiting to receive more user login information from another user or for a service request or wrapper token at 310 from workflow manager 125 operating within the web browser of the client device 120. If no service request is received at 310, then authentication engine 112 remains in standby mode. If a service request is received, then at 312 authentication engine 112 may parse a received wrapper token to extract the session certificate and then use the session certificate to validate the user credentials by comparing the extracted certificate against stored data in database 114. Upon successful user validation, authentication engine 112 can create an authentication identifier or token which grants the client access to the third party service by signaling that the client has privileges to access the third party service. In some implementations, the authentication identifier or token is only good for the single service request associated with it. At 314 authentication engine 112 can send the service request and the authentication identifier token to the third party service which is associated with the service request. At 316 authentication engine 112 can receive back from the third party service one or more data objects which can then be sent to workflow engine 125 operating within the web browser of the client device 120 at 318 for display in a browser based CRM UI.

Figure 4:
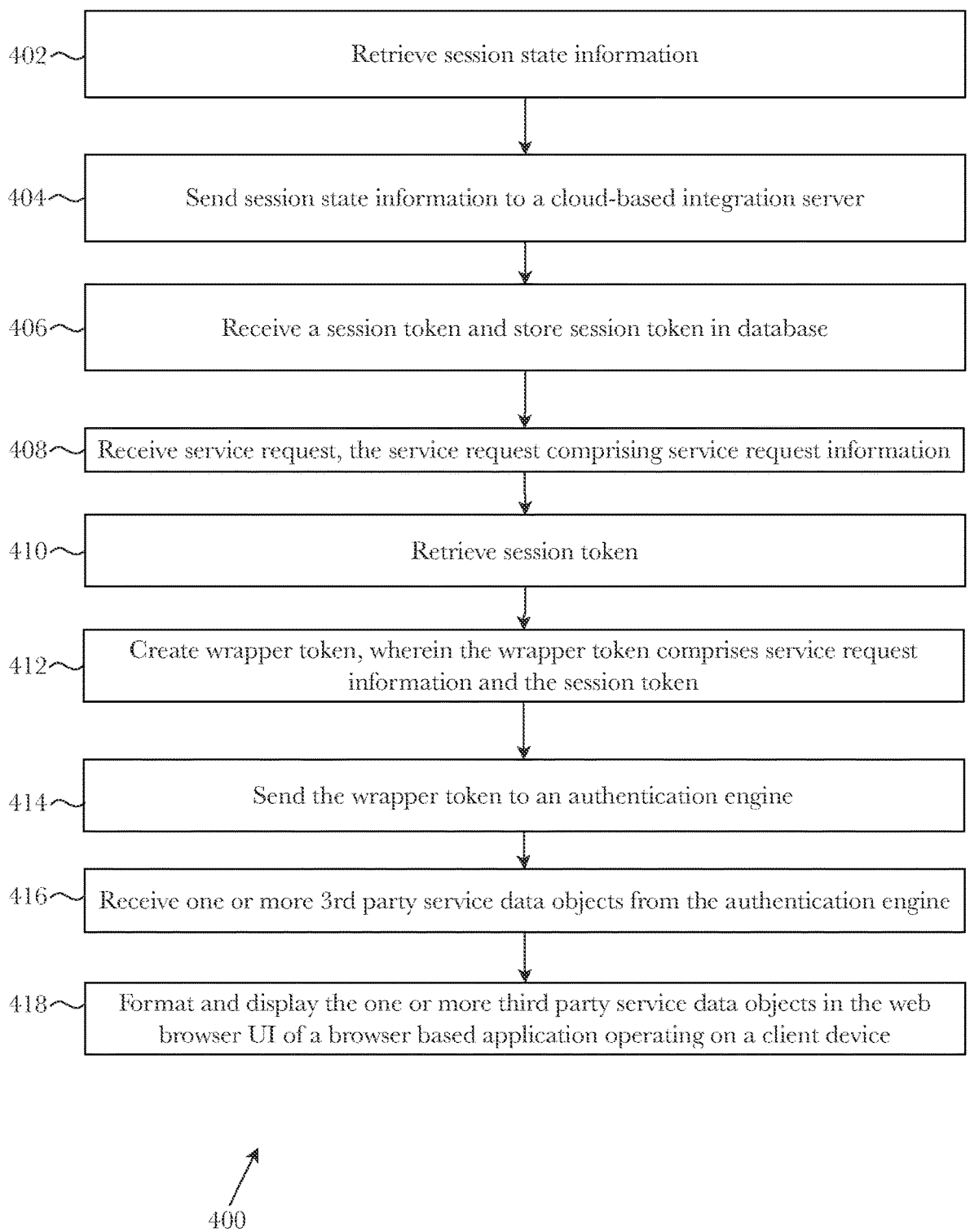
FIG. 4 is a flow diagram illustrating an exemplary method for providing client authentication and third party service integration utilizing one or more browser-based system components, according to an embodiment.

FIG. 4 is a flow diagram illustrating an exemplary method 400 for providing client authentication and third party service integration utilizing one or more browser-based system components, according to an embodiment. According to the embodiment, the process begins at 402 when a user of a client device submits user login information to cloud-based integration server 110 and workflow engine 112 retrieves session state information (e.g., data related to the user's current session within a browser based application such as, for example, a browser based CRM system) from session manager 123. At 404 this session state information may be sent to cloud-based integration server 110 where it may be processed by one of its components such as authentication engine 112. Workflow manager 125 can receive back from authentication engine 112 a session token and send the session token to session manager 123 for storage at 406. At this stage of the process workflow engine 125 operates in standby mode, ready to communicate with cloud-based integration server 110 or to process a service request, while session manager 123 monitors the current session state and updates session variables as necessary. At 408, responsive to a user clicking an interactive element 202 of the browser UI 201 thereby generating a service request, workflow engine 125 can receive the service request, which can comprise a plurality of service request information and retrieve the users session token from session manager 123 at 410. At 412 workflow engine 125 creates a wrapper token, wherein the wrapper token comprises service request information and the retrieved service token. The wrapper token is sent to authentication engine 112 at step 414 wherein the authentication engine can use the embedded session token to validate the user before distributing the service request to the appropriate third party service and/or microservice endpoint. At 416 workflow engine 125 can receive one or more third party service data objects from authentication engine 112 responsive to the service request. As a last step 418, workflow engine 125 may format and otherwise prepare the one or more third party service data objects for display in the web browser UI 201 of a browser based application operating on a client device 120.

Figure 5:
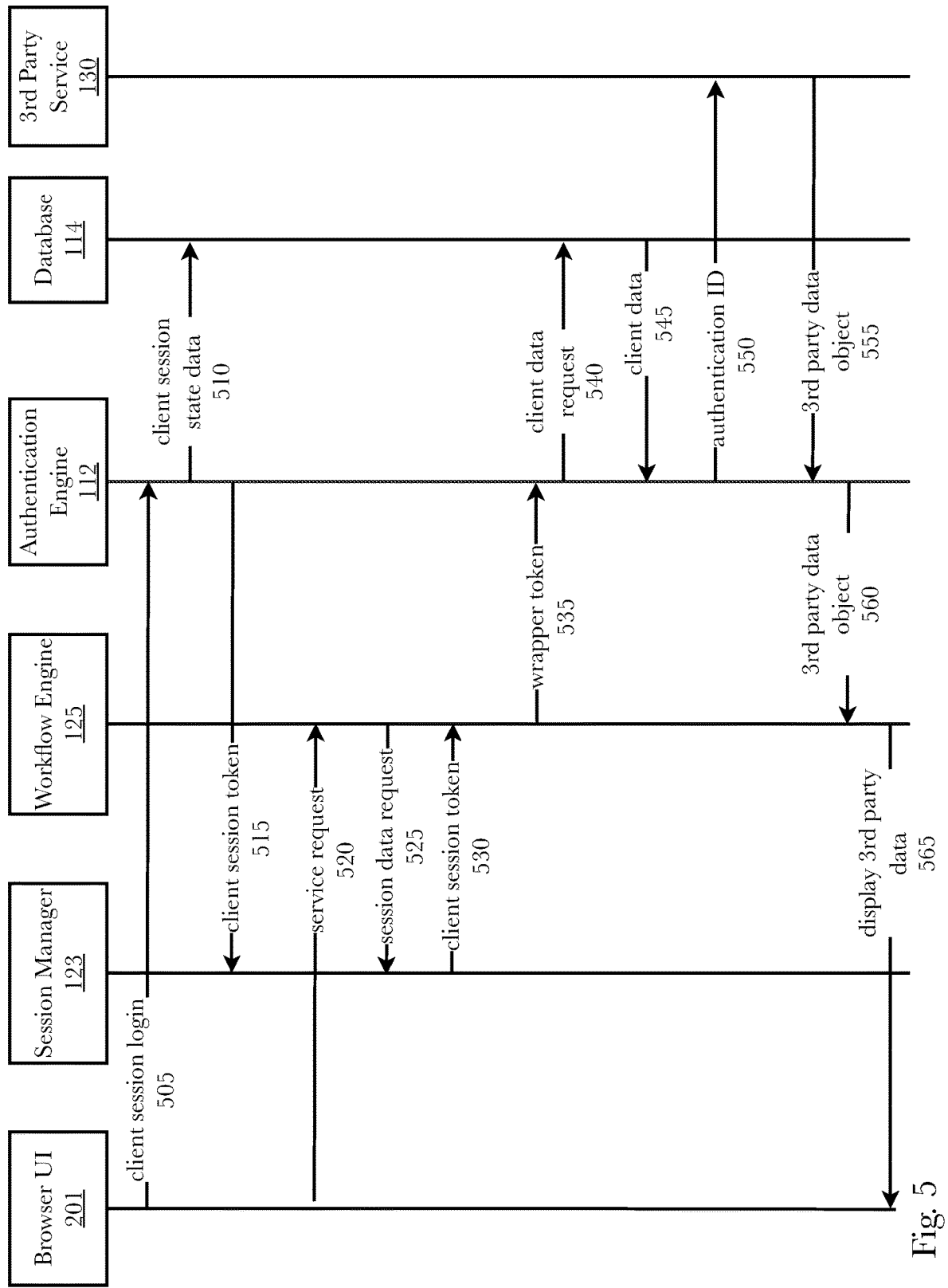
FIG. 5 is a message flow diagram illustrating an exemplary data message exchange between various components of the third party service integration system, according to an embodiment.

FIG. 5 is a message flow diagram illustrating an exemplary data message exchange between various components of the third party service integration system, according to an embodiment. According to the embodiment, the third party service integration system comprises a cloud-based authentication engine 112 and database 114, a plurality of third party services 130 (and/or 150) and/or microservices, and a client (i.e., user) device which has a web browser application user interface 201 and operating within the browser at least a session manager 123 and a workflow engine 125. A client may begin a session with browser-based CRM system by logging into said system with his or her login credentials (e.g., username and password). Session manager 123 may be configured to monitor and record client session state variables associated with the client's current browser-bases CRM system session. In some implementations, session state variables can include a session login time, a session ID (e.g., unique or semi-unique identifier associated with only the current session), etc.), and client login credentials such as a username and/or password. From the browser UI 201 the client (i.e., user) can log into cloud-based integration server 110 by sending a client session login request 505 to authentication engine 112. Authentication engine 112 sends user session state data and/or user data 510 to database 114 for storage and in turn sends a client session token 515 back to the browser UI 201 which is stored in session manager 123. In some implementations, workflow engine 125 may receive the client session token and send it to session manager 123 for storage. Workflow engine 125 is operating on standby within the browser of client device 120 waiting to receive a service request 520 from the browser UI 201. In some implementations, a client can submit a service request by clicking on an interactive element within the browser UI such as a button. Workflow engine 125 sends a request 525 to session manager 123 for the session data via the client session token which session manager sends back 530 to workflow engine 125. Workflow engine creates a wrapper token comprising at least the service request information and the session token and then transmits this wrapper token 535 to authentication engine 112. Authentication engine 112 performs a quick user validation check 540 by comparing session token with stored data 545 in database 114. Once a user has been validated, authentication engine 112 creates an authentication identifier token and transmits 550 it to the appropriate third party service 130, 150. The third party service 130 can process the service request and send back one or more of the requested third party data objects 555 to authentication engine 112 which can then transmit 560 the third party data to the appropriate client device 120 via workflow engine 125 which receives the one or more third party data objects from authentication engine 112. Workflow engine 125 can format and display the third party data 565 in a browser based CRM system UI 201 wherein a client (e.g., contact center agent, customer service representative, etc.) may construct, test, and execute workflows with the browser UI 201 using the third party data.

According to the embodiment, a workflow engine 125 is stored and operating on a client device (e.g., PC, laptop, smart phone, tablet, smart wearable, etc.) and configured to integrate a plurality of $3^{rd}$ party software applications into a browser-based CRM system, wherein the integration of third party services allows the client (i.e., contact center agent, customer service representative, etc.) to create bespoke workflows using third party service data which instantiate and execute within the browser-based CRM system all while improving network security by removing the direct exchange of personal identifying information ("PII") between the client device and the various services and by reducing the required amount of different server connections (and therefore reducing the amount of potential opportunities for malicious cyberattacks on data in transit).

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 6:
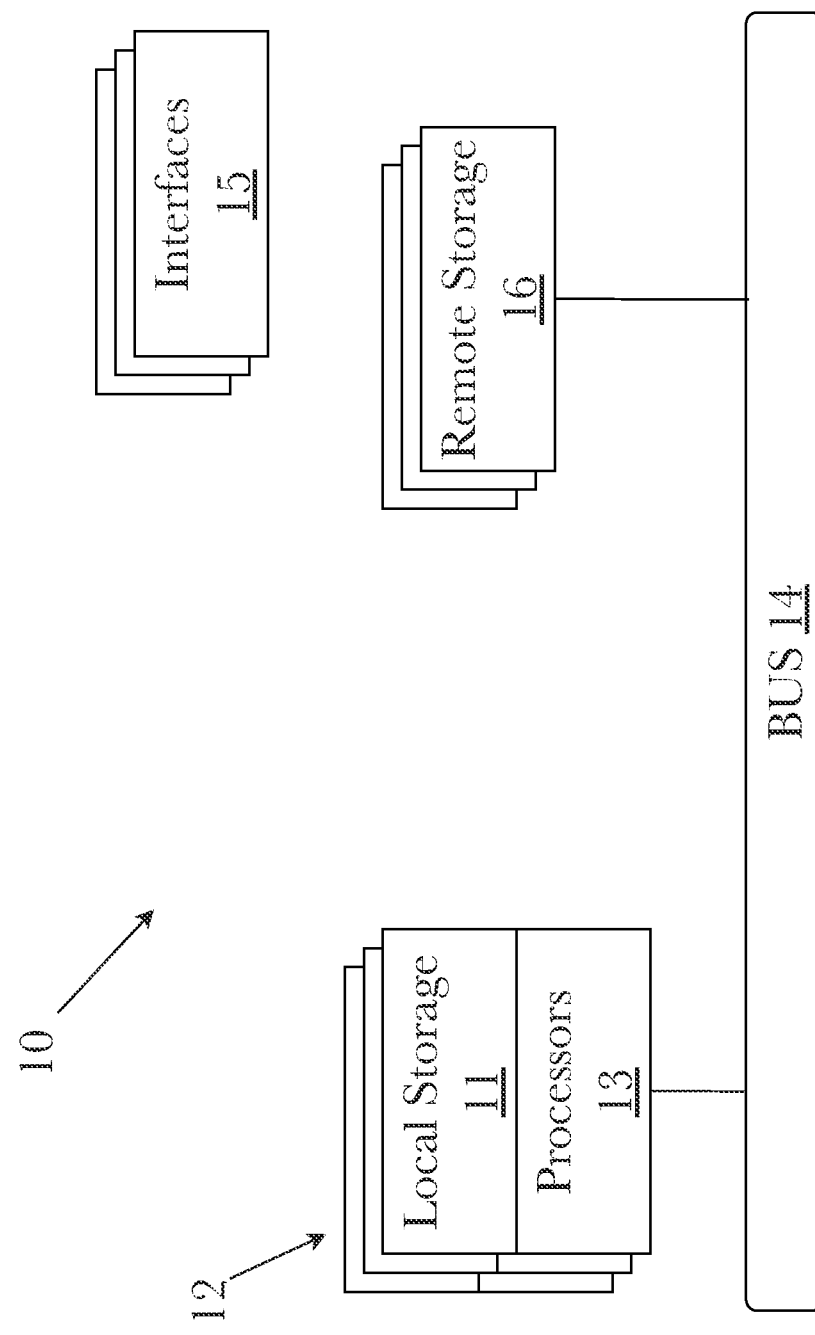
FIG. 6 is a block diagram illustrating an exemplary hardware architecture of a computing device.

Referring now to FIG. 6, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like.

It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 6 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a java virtual machine or equivalent, or files containing higher level code that may be executed by the computer using an interpreter (for example, scripts written in Python, Perl, Ruby, Groovy, or any other scripting language).

Figure 7:
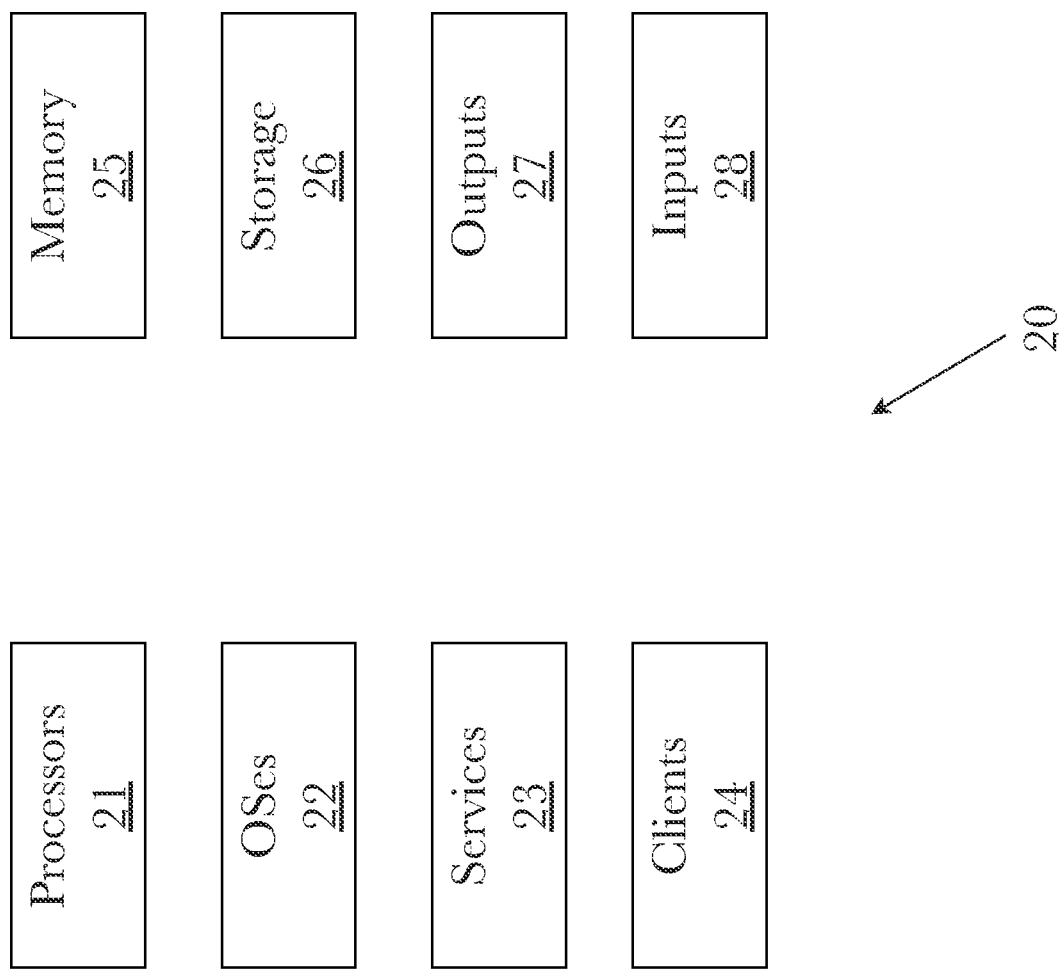
FIG. 7 is a block diagram illustrating an exemplary logical architecture for a client device.

In some aspects, systems may be implemented on a standalone computing system. Referring now to FIG. 7, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 6). Examples of storage devices 26 include flash memory, magnetic hard drive, CD-ROM, and/or the like.

Figure 8:
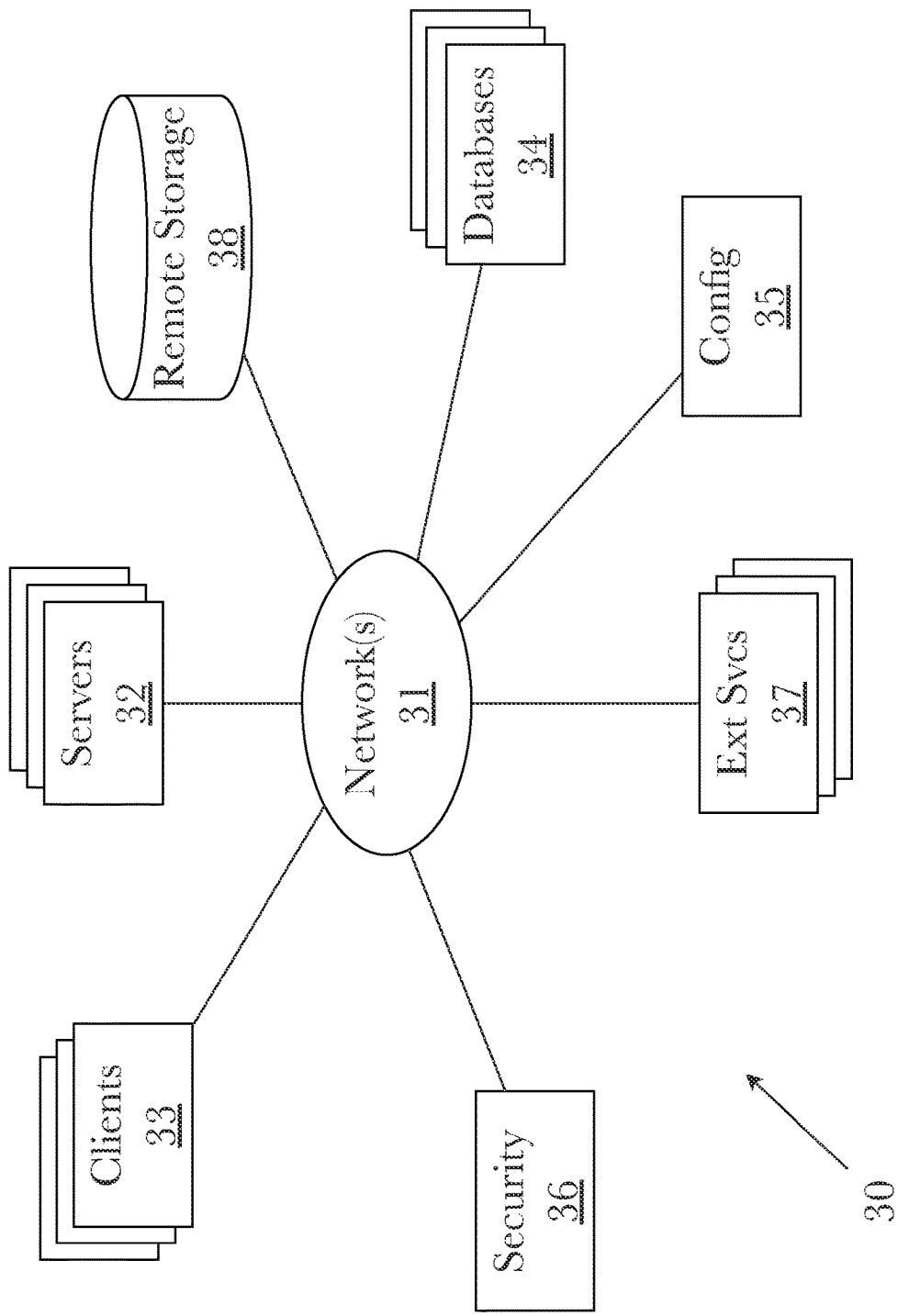
FIG. 8 is a block diagram showing an exemplary architectural arrangement of clients, servers, and external services.

In some aspects, systems may be implemented on a distributed computing network, such as one having any number of clients and/or servers. Referring now to FIG. 8, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 7. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 9:
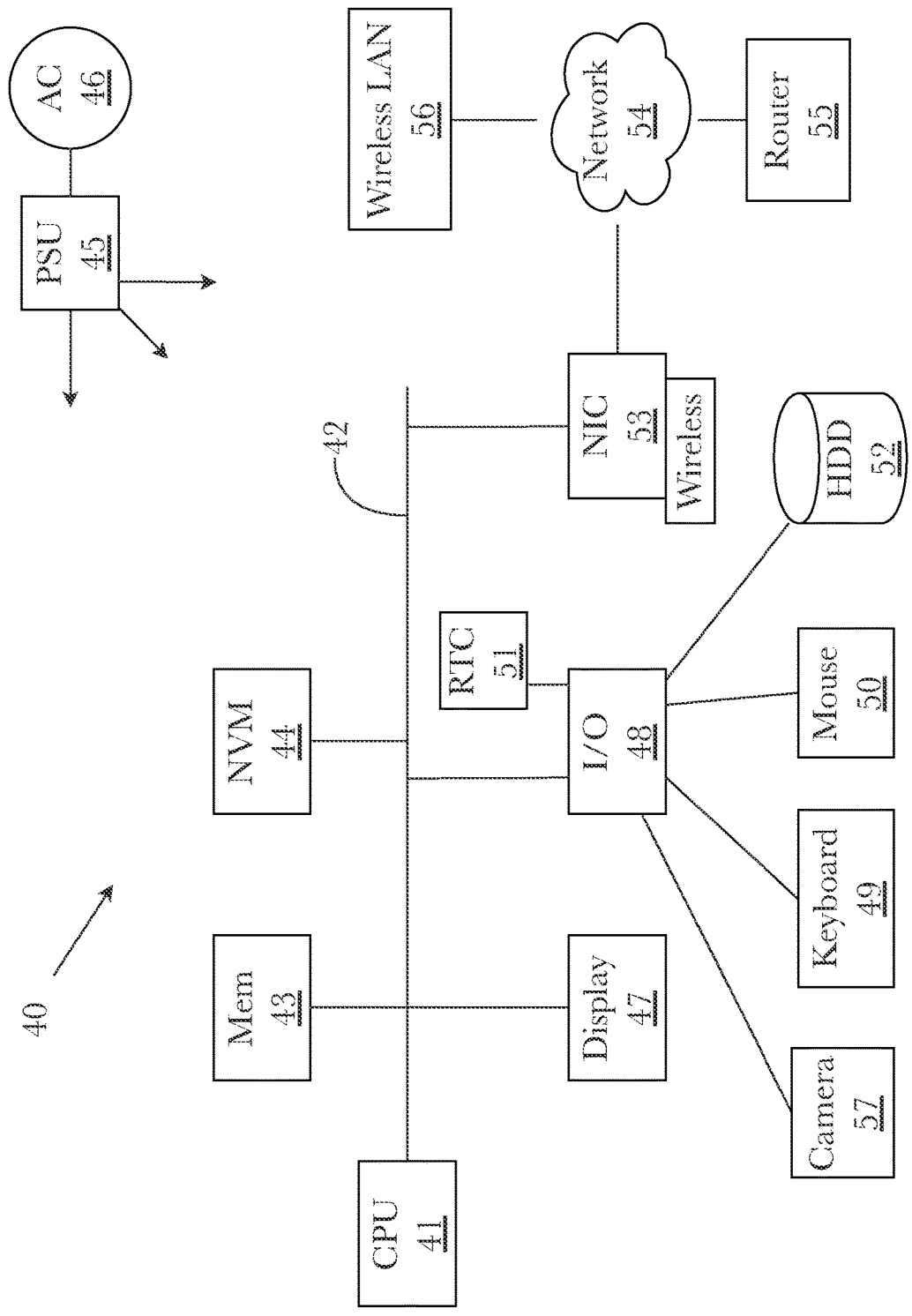
FIG. 9 is another block diagram illustrating an exemplary hardware architecture of a computing device.

FIG. 9 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for third-party application integration into a browser client application, comprising:
an authentication engine comprising at least a plurality of programming instructions stored in a memory of, and operating on at least one processor of, a computing device, wherein the plurality of programming instructions, when operating on the at least one processor, causes the computing device to:
receive user login information associated with a user, the user login information comprising one or more of a session ID, a device ID, and client ID;
create a client session token, generated by the authentication engine, wherein the client session token is based on the user login information, wherein the client session token comprises session state information including one or more of the device ID, the session ID, and the user ID;
send the client session token to a workflow manager;
receive a wrapper token from the workflow manager, wherein the wrapper token comprising a third-party service request and the client session token comprising the data elements for enhanced security and session management;
parse the wrapper token to extract the client session token;
validate the user associated with the client session token by comparing client session token data with user data stored in a database;
send the third-party service request to the appropriate third-party service;
receive, from the third-party service, one or more third-party data objects; and
send the one or more third-party data objects to the workflow engine; and
the workflow engine, operating as a distinct component from the browser client application and configured to interact with the browser-based application user interface, comprising at least a second plurality of programming instructions stored in the memory of, and operating on at least one processor of, the computing device, wherein the second plurality of programming instructions, when operating on the at least one processor, causes the computing device to:
receive the client session token from the authentication engine based on user login information provided by the user;
receive the third-party service request, the third-party service request comprising service request information comprising specific service request information;
create the wrapper token by combining the third-party service request information and the client session token;
send the wrapper token to the authentication engine;
receive the one or more third-party data objects; and
display the one or more third-party data objects within a browser-based application user interface.

2. The system of claim 1, wherein the browser-based application is customer relationship management system.

3. A method for third-party application integration into a browser client application, comprising the steps of:
- receiving user login information, associating with a user, the user login information comprising one or more of a session ID, a device ID, and client ID;
- creating a client session token, generated by the authentication engine, wherein the client session token is based on the user login information and includes additional data elements for enhanced security and session management;
- sending the client session token to a workflow engine;
- receiving a wrapper token from the workflow engine, wherein the wrapper token comprising a third-party service request and the client session token comprising the data elements for enhanced security and session management;
- parsing the wrapper token to extract the client session token;
- validating the user associated with the client session token by comparing client session token data with user data stored in a database;
- sending the third-party service request to the appropriate third-party service;
- receiving, from the third-party service, one or more third-party data objects;
- sending the one or more third-party data objects to the workflow engine;
- receiving the client session token from the authentication engine based on user login information provided by the user;
- receiving, by the workflow engine, the third-party service request, the third-party service request comprising service request information comprising specific service request information;
- creating the wrapper token by combining the third-party service request information and the client session token;
- sending the wrapper token to the authentication engine;
- receiving the one or more third-party data objects from the authentication engine; and
- displaying the one or more third-party data objects in a browser-based application user interface;
- wherein the authentication engine and the workflow engine each comprises a plurality of programming instructions stored in a memory of and operable on a processor of a computing device;
- wherein the workflow engine is a distinct component from the browser client application and interacts with the browser-based application user interface.

4. The method of claim 3, wherein the browser-based application is customer relationship management system.

* * * * *